United States Patent [19]

Faget

[11] Patent Number: 5,377,134

[45] Date of Patent: Dec. 27, 1994

[54] LEADING CONSTANT ELIMINATOR FOR EXTENDED PRECISION IN PIPELINED DIVISION

[75] Inventor: Roy R. Faget, Rochester, Minn.

[73] Assignee: International Business Machines Corporation, Armonk, N.Y.

[21] Appl. No.: 998,022

[22] Filed: Dec. 29, 1992

[51] Int. Cl.⁵ .............................................. G06F 7/52
[52] U.S. Cl. ................................ 364/765; 364/761
[58] Field of Search ............... 364/765, 764, 761, 748

[56] References Cited

U.S. PATENT DOCUMENTS

| | | | |
|---|---|---|---|
| 3,508,038 | 4/1970 | Goldschmidt et al. | 364/765 |
| 4,707,798 | 11/1987 | Nakano | 364/765 |
| 4,725,974 | 2/1988 | Kanazawa | 364/765 |
| 4,748,580 | 5/1988 | Ashton et al. | 364/736 |
| 4,779,218 | 10/1988 | Jauch | 364/754 |
| 4,797,849 | 1/1989 | Nakano | 364/765 |
| 4,878,190 | 10/1989 | Darley et al. | 364/752 |
| 4,999,801 | 3/1991 | Katsuno | 364/748 |
| 5,065,352 | 11/1991 | Nakano | 364/765 |
| 5,249,149 | 9/1993 | Cocanougher et al. | 364/765 |

OTHER PUBLICATIONS

IBM Technical Disclosure Bulletin vol. 33, No. 9 Feb. 1991, "Synthetic Newton-Raphson Error Term Determination for Division and Square Root".

*Primary Examiner*—Roy N. Envall, Jr.
*Assistant Examiner*—Emmanuel Moise
*Attorney, Agent, or Firm*—Palmatier, Sjoquist & Helget

[57] ABSTRACT

A method for performing a division operation in a two-stage multiply pipeline apparatus by forming an approximate reciprocal $R_0$ of the divisor $D_0$, and calculating a first error term $R_1$ by the equation $R_1 = 1 - R_0 D_0$, and forming a second error term $R_2 = R_1 * R_1$, and forming an approximate quotient $N_1 = R_0 * N_0$.

11 Claims, 2 Drawing Sheets

| TIME | STAGE 1 | STAGE 2 | STAGE 3 |
|------|---------|---------|---------|
| 1 | Lookup $R_0$ | | |
| 2 | $1 - R_0 \cdot D_0 = R_1$ | | |
| 3 | $R_0 \cdot N_0 = N_1$ | $R_1$ | |
| 4 | $R_1 \cdot R_1 = R_2$ | $N_1$ | |
| 5 | $N_1 + N_1 \cdot R_1 = N_2$ | $R_2$ | |
| 6 | $R_2 \cdot R_2 = R_3$ | $N_2$ | |
| 7 | $N_2 + N_2 \cdot R_2 = N_3$ | $R_3$ | |
| 8 | | $N_3$ | |
| 9 | $N_3 + N_3 \cdot R_3 = N_4$ | | |
| 10 | | $N_4$ | |
| 11 | | | $N_4$ |

FIG. 2

LEADING CONSTANT ELIMINATOR FOR EXTENDED PRECISION IN PIPELINED DIVISION

BACKGROUND OF THE INVENTION

This invention relates to an apparatus for performing division operations in computer processors. More particularly, the apparatus relates to a two-stage multiply pipeline apparatus for implementing a divide operation by utilizing a derivative of the Newton-Raphson formula. The apparatus produces a result which has reliable precision beyond to the least significant bit of the result term which is developed in each of the iterations associated with the multiply pipeline.

The fastest techniques for performing division in a computer processor involve the use of multiply hardware or multiply-add hardware which is designed to implement a Newton-Raphson formula or algebraic equivalent. The Newton-Raphson formula is defined as:

$$X_{i+1} = X_i * (2 - X_i * D)$$

The foregoing formula describes how an approximation for the reciprocal of a divisor can be multiplied by the dividend to produce an approximation for the quotient. The formula is used repeatedly to obtain a desired precision for a reciprocal, and every application of the formula results in a doubling of the precision of the reciprocal. Each iteration involves a multiplication step and a subtraction step which must wait until the previous iteration is finished, followed by another multiplication step which must wait for the result of the previous subtraction. Therefore, implementation of the conventional Newton-Raphson formula is impractical for multiply pipeline operations.

A quotient convergence formula which is algebraically equivalent to the Newton-Raphson formula provides iterative calculations for the quotient rather than the reciprocal. One extra multiplication is required per iteration, but each calculation is pipelineable, which means that for a two-stage pipeline any one calculation does not depend on the previous calculation for a result as one of the input operands of the one calculation. Two-stage multiply-add pipelines require one fewer machine cycle per iteration using quotient convergence algorithm as opposed to the unaltered Newton-Raphson formula. The three terms which make up the quotient convergence formula are:

$$N_{i+1} = N_i * R_i$$

$$R_{i+1} = 2 - D_i * R_i$$

$$D_{i+1} = D_i * R_i$$

To provide the initial values, $R_0$ is given by a look-up table, commonly implemented with combinatorial logic or a Read Only Memory (ROM), and this initial value provides the "seed" value for the reciprocal of the divisor out to a few bits of precision. This "seed" is identical to the "seed" used as $X_0$ for the first Newton-Raphson iteration in the Newton-Raphson formula. $D_0$ is the divisor or denominator, and $N_0$ is the dividend or numerator.

The R term in the quotient convergence formula is sometimes called an error term because the magnitude of the deviation of the particular $R_i$ in question from unity is equal to the precision of the corresponding quotient for that iteration. The quotient convergence formula and the fact that it is pipelineable and has machine cycle-saving advantages is itself known in the art. The pipelining process for using the quotient convergence formula in computer processor hardware generally follows the following process steps:

1) Look up the seed value for the reciprocal $R_0$, of the divisor $D_0$.
2) Solve for $N_1 = R_0 * N_0$, where $N_0$ is the dividend.
3) Solve for $D_1 = R_0 * D_0$.
4) Solve for $R_1 = 2 - R_0 * D_0$.
5) Repeat steps 2, 3 and 4, producing a more precise N which approaches the quotient, and D and R terms which are of opposite sign and approach the constant value of 1.

The problem with the foregoing pipelining solution is that it does produce a loss of precision near the least significant bit of each iterative result term. This loss of precision is a consequence of having to round or truncate the full precision result to the precision of the source operands of each iterative expression. In order to overcome this problem, precision must be maintained beyond the least significant bit of the result, in order to provide a correct rounding for the final result. Under existing IEEE standards for calculations involving floating point numbers, a result must be rounded as if an infinite amount of precision bits were maintained; the only way of actually meeting this requirement is by having precision at least a few bits to the right of the least significant bit. Therefore, the hardware implementation requires extra-width multiply logic capability for carrying the extra bits, which are necessary to preserve precision or the result.

SUMMARY OF THE INVENTION

The present invention provides an apparatus for performing pipelineable iterations utilizing a novel technique for selecting the iterations. The technique eliminates the D term in the quotient convergence formula, and the R term has the constant value of 1 removed. The leading zeroes that remain in R may be removed so that the extra precision gained in the trailing bits may be applied as a part of the source term for the next iteration. To calculate the N terms, a multiply-add pipeline is required with a few extra bits allowed for the addend source to preserve the extended precision in N. The apparatus utilizes three iterations of N for producing a final N which has a precision approaching the quotient.

BRIEF DESCRIPTION OF THE DRAWINGS

FIG. 2 shows diagrammatically the implementation of the technique for using the hardware stages of FIG. 1.

DESCRIPTION OF THE PREFERRED EMBODIMENT

Figure 1:
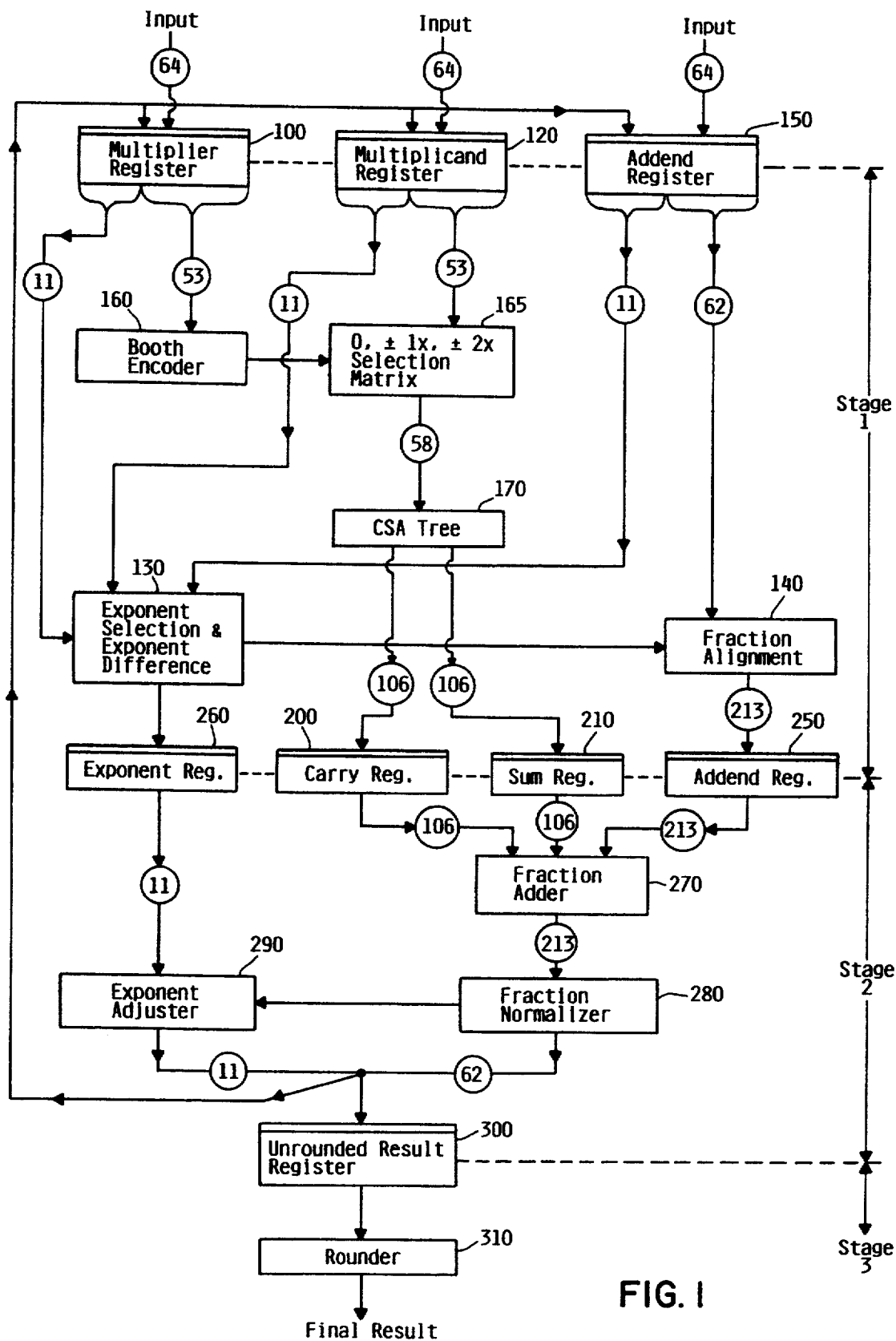
FIG. 1 shows a diagram of a typical multiply-add hardware circuit implementing the apparatus in three stages.

Referring to FIGS. 1 and 2, the multiply-add hardware of FIG. 1 is activated according to the diagrammatic sequences of FIG. 2. The circled numbers shown on FIG. 1 indicate the number of bits of data that are transmitted between the various circuit elements. The operation and sequencing of the hardware occurs over a preset number of time intervals (1-11) as shown in FIG. 2. The multiplier register 100 comprises 64 bit positions, the lower 53 bit positions containing a fraction and the upper 11 bit positions containing an exponent. In practical applications the registers described with reference to this invention may also have additional bit positions for sign bit values. The multiplier register is initially loaded with the value $R_0$, as further described herein. The multiplicand register 120 is also a 64 bit position register, utilizing 53 bit positions for fraction and 11 bit positions for the exponent. The multiplicand register is initially loaded with the value $D_0$ as further described herein. The addend register 150 has 62 bit positions for holding a fraction, and 11 bit positions for an exponent. The additional nine bit positions in the addend register are selected in the preferred embodiment for providing the additional precision described in connection with the invention.

The booth encoder 160 and the selection matrix 165 comprise logic circuits for forming O, plus or minus 1X, and plus or minus 2X values for the fraction held in the multiplicand register 120, according to techniques which are known in the art and outside the scope of the present invention. The output of the selection matrix 165 consists of 27 terms of 58 bits each, which are fed as an input to the CSA tree 170. The CSA tree 170 produces a 106-bit output which is fed to the sum register 210, and a 106-bit output which is fed to the carry register 200. The exponent values from the multiply register 100, the multiplicand register 120 and the addend register 150 are all fed into the exponent selection and exponent difference logic network 130. One output from logic network 130 is utilized as an alignment signal to the fraction alignment network 140, which causes the 62-bit value from the addend register 150 to be shifted a predetermined amount over 213 available bit positions. The other output from the exponent selection and exponent difference network 130 is fed to an exponent register 260, which holds the exponent associated with the fraction values in registers 200 and 210.

The stage 2 logic utilizes the values in exponent register 260, and in registers 200, 210 and 250, to form a fraction sum in the fraction adder network 270, and to normalize that sum in fraction normalizer network 280, and to feed the result into an unrounded result register 300. The exponent register 260 is fed to the exponent adjuster 290, which operates, in conjunction with fraction normalizer logic 280 to provide an exponent value which is also fed into the unrounded result register 300. The contents of unrounded result register 300 are fed into the rounder circuit 310 during stage 3, which produces a final result, according to techniques which are beyond the scope of the present invention.

During the first time interval a table look-up operation is implemented, in order to load the seed value $R_0$ of the reciprocal of the divisor into the multiplier register 100. The seed value $R_0$ is a 9-bit value, approximately equal to the reciprocal of the divisor, but always less than the true value of the reciprocal of the divisor. At the initial step the value "1" is loaded into addend register 150, and the original divisor $D_0$ is loaded into register 120.

During the second time interval the divisor $D_0$, loaded into the multiplicand register 120, is multiplied by $R_0$, utilizing the multiplier logic of FIG. 1. According to this logic the exponents of the values in registers 100 and 120 are added by network 130, the exponent in addend register 150 is subtracted from this result and the resulting value determines the number of positions which to shift the addend fraction in register 150, in transferring it to register 250. The exponent sum in logic circuit 130 (from registers 100 and 120) is placed in exponent register 260. The least significant bits of the value in register 100 is utilized in the booth encoder 160 and selection matrix 165 to develop either a zero (0), plus or minus the value in register 120, or plus or minus twice the value in register 120, and this selected value is passed through the carry-store-adder tree (CSA) 170 to the carry register 200 and the sum register 210. This value is combined with the contents of the addend register 250 to form, in stage 2, the fraction $(1-R_0*D_0)$ in the fraction adder 270. The value in the fraction adder 270 is passed to the fraction normalizer 280, and is shifted to normalize the value. The shifting operation also adjusts the exponent in exponent adjuster circuit 290, which receives a second input from the exponent register 260, so as to produce the normalized fraction and proper exponent for the value $R_1$.

At the start of the third time interval the original numerator $N_0$ is loaded into register 120, and the 8-bit seed value $R_0$ remains loaded into register 100. The multiply logic forms the product $(R_0*N_0)$, which is defined as $N_1$, which product is formed at the output of the fraction normalizer circuit 280 and the exponent adjuster circuit 290. The value $R_1$, which previously was formed at the output of these circuits is gated back to multiplier register 100 and multiplicand register 120.

During the fourth time interval the contents of registers 100 and 120 ($R_1$) are multiplied together to form the result $R_2$ (generally referred to as $R_i+1$), which appears, at the end of stage 2 at the outputs of fraction normalizer 280 and an exponent adjuster 290. The value $N_1$ (generally referred to as $N_i$), which previously was found at these outputs is gated back to the input of multiplier register 100 and addend register 150. The value $R_1$ (generally referred to as $R_i$) continues to be retained by multiplicand register 120.

During the fifth time interval the product $N_1*R_1$ (generally referred to as $N_i*R_i$) is formed by the multiplier logic, and is summed with the value $N_1$ held in the addend register 150 to form the new result $N_2$, which appears at the output of the fraction normalizer 280 and the exponent adjuster 290. The value $R_2$, previously held at these outputs is gated back to the inputs of registers 100 and 120.

During the sixth time interval the multiplier logic forms the product $R_2*R_2$, thereby creating the result $R_3$ at the output of the fraction normalizer circuit 280 and the exponent adjuster circuit 290. The result $N_2$ which was previously held at these outputs is gated back to multiplier register 100 and addend register 150, and the result $R_2$ is retained in multiplicand register 120.

During the seventh time interval the product $N_2*R_2$ is formed in the multiplier circuit and is summed with the value $N_2$ held in the addend register 150, to form the new result $N_3$ at the output of the fraction normalizer 280 and the exponent adjuster 290. The value $R_3$, previously held at these outputs is gated back to the multiplier register 100, and the value $N_3$ is gated back to the multiplicand register 120 and the addend register 150. These gating operations are accomplished during the eighth time interval.

During the ninth time interval the product $N_3*R_3$ is formed in the multiplier circuit, and the result is summed with the value $N_3$ held in the addend register 150, to product the new value $N_4$ at the output of the fraction normalizer 280 in the exponent adjuster 290. This process concludes during time interval 10, and during time interval 11 the new value $N_4$ is passed to the unrounded result register 300 and the rounder circuit 310, to produce the final result $N_4$. The value $N_4$ might require subsequent processing in circuits to obtain the true quotient value.

The control and gating circuits necessary for the implementation of the hardware logic shown on FIG. 1, according to the operational steps summarized on FIG. 2, are well known to those having skill in this art. Likewise, the particular logic circuits which accomplish the mathematical functions described in FIG. 1 and FIG. 2 are well known, and the novel method may be practiced by designing the control and gating circuits in conjunction with the hardware circuits of FIG. 1. The method may be summarized with reference to the initial values identified with a division operation, as follows:

$N_0$—The original dividend or numerator;
$D_0$—The original divisor or denominator;
$R_0$—The approximate reciprocal of the divisor, which is smaller than the true value of the reciprocal of the divisor and has 8 significant bits of precision.

Given the foregoing initial conditions, the steps of the method are simple and straightforward:
1) Develop a first error term $R_1 = 1 - R_0*D_0$;
2) Form the approximate quotient $N_1 = R_0*N_0$;
3) Form the second error term $R_2 = R_1*R_1$;
4) Form the second approximate quotient $N_2 = N_1 + R_1*N_1$;
5) Repeat steps 3) and 4) to produce a more precise quotient N which approaches the actual true quotient value.

The number of iterations which are selected for the foregoing process are a function of the desired precision, the extra addend register stages which are provided, and the initial precision of the seed value $R_0$. For example, the implementation of a double-precision floating point operation requires nine extra addend register stages, three iterations which produces a quotient N from a 9-bit seed value $R_0$.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A two-stage multiply pipeline apparatus for performing floating point division of a dividend $N_0$ by a divisor $D_0$ producing a quotient, comprising:
   a) a first input for providing the values of the dividend $N_0$ and divisor $D_0$,
   b) a second input for providing an initial "seed value" $R_0$ for the reciprocal of the divisor $D_0$,
   c) a multiplying circuit connected to said first input and said second input,
   d) an adding circuit connected to said multiplying circuit,
   e) a rounding circuit connected to said multiplying circuit and said adding circuit,
   f) a first logic circuit for controlling said first input, said second input, said multiplying circuit and said adding circuit to carry out the operations:

$$R_1 = 1 - R_0*D_0 \quad \quad 1)$$

$$N_1 = R_0*N_0 \quad \quad 2)$$

$$R_{i+1} = R_i*R_i, \quad \quad 3)$$

g) a second logic circuit for controlling said multiplying circuit and said adding circuit to carry out the operation:

$$N_{j+1} = N_j + R_j*N_j \quad \quad 4)$$

wherein $N_0$, $N_1$, $N_j$ and $N_{j+1}$ are increasingly precise values of the quotient, and
   h) final stage logic for controlling said rounding circuit, to produce a rounded value of the quotient
wherein said first logic iterates operation 3 i times and said second logic iterates operation 4 j times, with i and j ranging from 1 to a value appropriate for the desired precision, operation 4 always following step 3.

2. The apparatus in claim 1, wherein $R_0$ is less than the true value of the reciprocal of divisor $D_0$.

3. The apparatus in claim 2, wherein the maximum value of i is 2 and the maximum value of j is 3.

4. The apparatus of claim 3, wherein the reciprocal $R_0$ comprises nine binary bits.

5. A two-stage multiply pipeline apparatus for performing floating point division of a dividend by a divisor for producing a quotient, comprising:
   a) a first input for providing the values of the dividend and the divisor,
   b) a second input for providing an initial reciprocal guess of the divisor,
   c) a multiplying circuit connected to said first input and said second input,
   d) an adding circuit connected to said multiplying circuit,
   e) a rounding circuit connected to said multiplying circuit and said adding circuit,
   f) means for accessing said initial reciprocal guess of said divisor from said second input,
   g) means for accessing the divisor from said first input,
   h) first logic means for:
      1) computing an error term by multiplying said reciprocal guess by the divisor in said multiplying circuit and subtracting the result from the value 1 in said adding circuit,
      2) computing an initial guess at the quotient by multiplying said reciprocal guess by the dividend in said multiplying circuit, and
      3) multiplying said error term by itself in said multiplying circuit, thereby increasing the precision of said error term,
   i) second logic means for computing a more precise quotient by multiplying said error term by the quotient in said multiplying circuit and adding the result to the quotient, and
   j) means for rounding the final quotient
wherein said first logic means iterates $R_{i+} = R_i*R_i$ times and said second logic means iterates $N_{j+1} = N_j + R_j*H_j$ with i and j ranging from 1 to a value appropriate for the desired precision.

6. The apparatus in claim 5, wherein $R_0$ is less than the true value of the reciprocal of divisor $D_0$.

7. The apparatus in claim 6, wherein the maximum value of i equals 2 and the maximum value of j equals 3.

8. The apparatus of claim 7, wherein the reciprocal $R_0$ comprises nine binary bits.

9. A two-stage multiply pipeline apparatus for performing floating point division of a dividend by a divisor $D_0$ for producing a quotient, comprising:
   a) a first input for providing the values of the dividend $N_0$ and the divisor $D_0$,
   b) a second input for providing an initial "seed value" $R_0$ for the reciprocal of the divisor $D_0$,
   c) a multiplying circuit connected to said first input and said second input, said multiplying circuit further comprising a multiplier register and a multiplicand register,
   d) an adding circuit connected to said first input and said multiplying circuit, said adding circuit further comprising an addend register,
   e) a rounding circuit connected to said multiplying circuit and said adding circuit,
   f) a first logic circuit for controlling said first input, said second input, said multiplying circuit and said adding circuit wherein:
      1) during a first time interval the value $R_0$ from said second input is loaded into said multiplier register, the number 1 is loaded into said addend register, and the divisor $D_0$ is loaded into said multiplicand register from said first input;
      2) during a second time interval the values in said multiplier register, multiplicand register and addend register are combined to form the result $R_1 = 1 - R_0 * D_0$;
      3) during a third time interval, the dividend $N_0$ is loaded into said multiplicand register and said multiplier circuit forms the result $N_1 = R_0 * N_0$ and result $R_1$ is gated back into said multiplier register and said multiplicand register;
      4) during a fourth time interval said multiplier register and said multiplicand register are multiplied by said multiplier circuit to form the result $R_{i+1} = R_i * R_i$ and the value $N_i$ is gated back into said multiplier register and said addend register, said multiplicand register still containing the result $R_i$, i having a value of 1;
   g) a second logic circuit for controlling said multiplying circuit and said adding circuit wherein:
      1) during a fifth time interval said multiplier circuit forms the product $N_i * R_i$, which is summed with the value $N_i$ in said addend register to form result $N_{i+1} = N_i + N_i * R_i$ and result $R_{i+1}$ is gated back into said multiplier register and said multiplicand register, i having a value of 1,
      2) during a sixth time interval the logic in the fourth time interval is iterated, with i having a value of 2,
      3) during a seventh time interval, the logic in the fifth time interval is iterated, with i having a value of 2, forming result $N_3 = N_2 + N_2 * R_2$;
      4) during an eighth time interval, the result $R_3$ is gated back into said multiplier register and the value $N_3$ is gated back into said multiplicand register and said addend register;
      5) during a ninth and tenth time interval, the multiplier logic forms the result $N_3 * R_3$, which is added to value $N_3$ to produce value $N_4$,
   h) final stage logic for controlling said rounding circuit, to produce a rounded value of the quotient wherein during an eleventh time interval value $N_4$ is passed to said rounding logic to produce final result $N_4$.

10. The apparatus of claim 9, wherein $R_0$ is less than the true value of the reciprocal of divisor $D_0$.

11. The apparatus of claim 10, wherein $R_0$ comprises nine binary bits.

* * * * *

UNITED STATES PATENT AND TRADEMARK OFFICE
CERTIFICATE OF CORRECTION

PATENT NO.  : 5,377,134
DATED       : December 27, 1994
INVENTOR(S) : Roy R. Faget It is certified that error appears in the above-identified patent and that said Letters Patent is hereby corrected as shown below:

In column 1, line 43, "of" (second occurrence) should be -- for --;
In column 1, line 45, insert -- the -- after the word "using".
In column 2, line 34, "or" should be -- of --.
In claim 5, column 6, line 59, "$R_i+=R_i*R_i$ times" should read -- $R_i+1=R_i*R_i$ i times --.
In claim 5, column 6, line 60, "$N_j+1=N_j+R_j*H_j$ with" should read -- $N_j+1=N_j+R_j*N_j$ j times --.

Signed and Sealed this

Fourteenth Day of March, 1995

*Attest:*

BRUCE LEHMAN

*Attesting Officer*     *Commissioner of Patents and Trademarks*